United States Patent [19]

Vis et al.

[11] 4,292,740

[45] Oct. 6, 1981

[54] SELF-ACTUATED DISPLACEMENT TRANSDUCER

[75] Inventors: Arthur D. Vis, Warren; Billie Feinberg, Oak Park, both of Mich.

[73] Assignee: Candid Logic, Inc., Hazel Park, Mich.

[21] Appl. No.: 46,586

[22] Filed: Jun. 7, 1979

[51] Int. Cl.³ .............................................. G01B 3/22
[52] U.S. Cl. ............................. 33/172 E; 33/DIG. 2
[58] Field of Search .......... 33/172 E, DIG. 2, 147 N; 73/37.5

[56] References Cited

U.S. PATENT DOCUMENTS

| | | | |
|---|---|---|---|
| 2,833,046 | 5/1958 | Jeglum | 33/147 N |
| 3,216,118 | 11/1965 | Pistoles | 33/172 E |
| 3,434,086 | 3/1969 | Houpt et al. | 33/172 E X |
| 4,175,331 | 11/1979 | Johnson | 33/172 E |

FOREIGN PATENT DOCUMENTS 2750445  1/1978  Fed. Rep. of Germany .... 33/172 E

Primary Examiner—Gerald Goldberg
Assistant Examiner—Joseph W. Roskos
Attorney, Agent, or Firm—Krass, Young & Schivley

[57] ABSTRACT

An LVDT displacement transducer and a probe actuation arrangement integrated into a probe assembly. The probe assembly includes a tubular housing within which is mounted at one end an LVDT and within the other the probe actuation arrangement. In the preferred embodiment, an air pressure actuator arrangement is utilized and comprises a stepped diameter probe extension shaft having a smaller diameter section joined to the LVDT core element, and extending through a bulkhead bushing into a pressure chamber, the larger diameter section of the shaft passing out through the opposite end of the housing and serving to mount the probe sensor contact. The differential diameter of the stepped probe extension shaft is subjected to air pressure via an air fitting communicating with the air chamber and which acts against a return spring to enable self actuation of the probe extension shaft and attached core element. In one alternate version, the stepped probe extension shaft is prevented from rotation for applications requiring a fixed orientation of the probe shaft and includes the provision of a small roller bearing moving within a longitudinal slot formed in the bulkhead bushing. In another embodiment, the probe shaft is extended by a spring rather than air pressure. LVDT transducers of shorter gaging range than the probe displacement are also disclosed, creating either pretravel or overtravel of the probe shaft.

17 Claims, 6 Drawing Figures

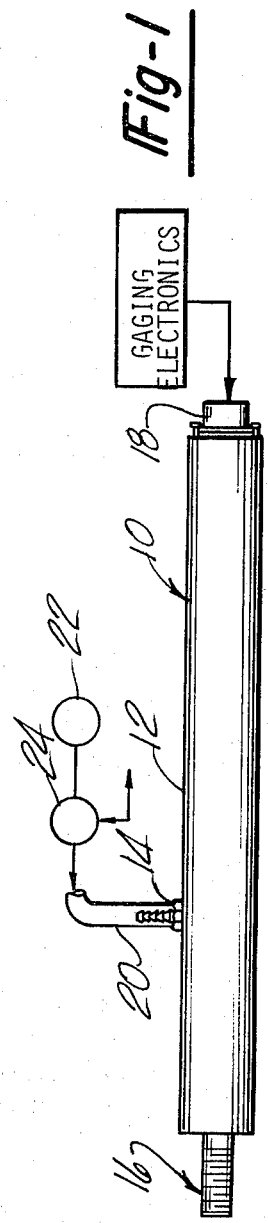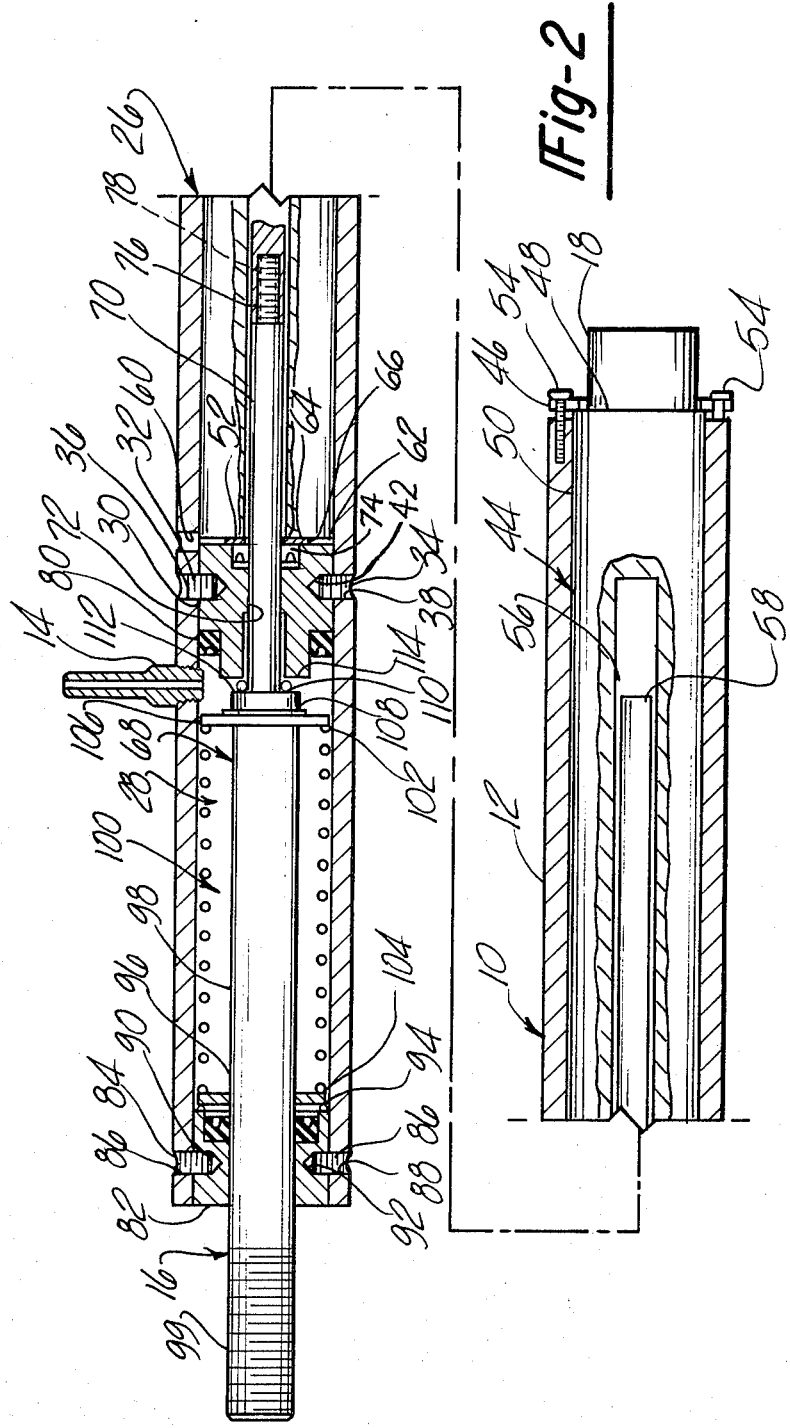

SELF-ACTUATED DISPLACEMENT TRANSDUCER

BACKGROUND DISCUSSION

This invention concerns displacement transducers and more particularly the LVDT (linear variable differential transformer) type transducers in which a ferromagnetic core element is slidably disposed within a bore formed in a transformer housing, the transformer housing mounting a pair of pickup coils and a power coil which serve to generate a linear output electrical signal in correspondence with the position of the core element in the transformer bore.

Such transducers are widely used in industrial gaging applications in which workpieces are gaged by being disposed with a gaging fixture, with a probe shaft having a probe contact element caused to move outwardly into contact with the workpiece, the electrical signal corresponding to core displacement generating a gaging signal corresponding to a particular dimension of the workpiece.

In automated setups, the probe is caused to be actuated by various arrangements such as to automatically be displaced into contact with the workpiece. Generally, such arrangements include a mechanism external to the LVDT with the actuation components exposed. This creates a gaging setup vulnerable to damage and in industrial plants this is a considerable disadvantage.

Also, the cost of the overall gaging setup is expensive due to the need to assemble the LVDT assembly into the actuation mechanism.

Self-contained actuation arrangements have heretofore been attempted. For the most part, these have consisted of fluid pressure cylinder arrangements located on the backside of the LVDT or other transducer pushing the core and probe shaft into engagement with the workpiece. This backside location precludes the use of standardized electrical connections to the LVDT which normally are supplied with a connector on the rear face designed to mate with standard electrical connectors.

In addition, such designs which have heretofore been provided have been relatively delicate and of a limited short stroke capacity. Many of the designs rely on a fluid actuation of the core element itself which limits the operating characteristics of the actuating to the dimensions of the transformer housing bore and core element.

It is also important in such industrial applications that the actuation arrangement be operated by easily achievable air pressure. If the area under pressure is large, a too-harsh action of the actuator arrangement will result. Whereas, if the air pressure is attempted to be lowered, relatively costly low pressure regulators must be relied on which increase the expense of the gaging setup.

LVDT transducers are generally more costly with increasing gaging range. On the other hand, the range in which the actual gaging needs to be done is relatively limited in comparison to the range of motion of the probe in reaching the surface which is to be gaged. It therefore would be desirable to be able to use relatively short range LVDT transducers in such probe assemblies which could accommodate pretravel (or overtravel) of the probe relative the gaging range of motion of the probe.

In some designs, the mounting of extensions to the LVDT can cause side loadings to be imposed on the LVDT core, and thus to the interior of the LVDT core increasing wear and friction during gaging stroking.

Accordingly, it is an object of the present invention to provide a displacement transducer integrated with an actuator arrangement which is rugged in construction.

It is a further object of the present invention to provide such a combination which does not require modification of the rear face portion of commercially available standard LVDT units, such as to enable standard electrical connectors to be employed therewith.

It is yet another object of the present invention to provide such an arrangement in which the fluid pressure actuation is not achieved by means of the components of the LVDT transducer.

It is still a further object of the present invention to provide a probe assembly utilizing a relatively short range transducer in conjunction with an extended range probe motion.

It is also an object of the present invention to provide a LVDT probe assembly in which side loadings are not transmitted into the LVDT core element.

SUMMARY OF THE INVENTION

These and other objects of the present invention, which will become apparent upon a reading of the following specification and claims, are achieved by an arrangement wherein the displacement transducer and the actuator arrangement are located in a common tubular housing, with the displacement transducer received in one end and the actuator arrangement located within the other end. The transducer core element is secured by the threaded connection to a nonferromagnetic stepped probe shaft extension with a smaller diameter section passing through a bulkhead bushing and seal, the larger forward section of the stepped shaft passing through forwardly spaced end cap bushing and sealed with respect to the other end of the housing, and having the probe contact secured thereto. The spaced bulkhead and end cap bushings provide support for the probe shaft extension, eliminating the transmission of side loadings into the LVDT core element.

The shoulder between the small and large diameter sections of the stepped probe extension shaft is disposed within a fluid pressure chamber defined by the actuator end of the tubular housing and is adapted to be pressurized by means of an air fitting extending into communication therewith. The differential in diameters between the sections generates a net actuation force when the air chamber is pressurized, and the actuation force generated by the air pressure is limited to that acting on the differential area between the small diameter section and the large diameter section of the stepped probe extension shaft such that the actuation forces are relatively modest.

A return spring is disposed in surrounding relationship to the large diameter section seated on a retaining washer acting to urge the probe extension shaft to a return position in which the shaft shoulder abuts a forward face of the bulkhead bushing, with an O-ring passed over the small diameter section cushioning the returning movement of the stepped probe extension shaft.

A vent hole is provided communicating with the clearance space between the LVDT and an opposing face of the bulkhead bushing to vent the transformer bore and preclude the development of a vacuum by stroking of the core element, negating any tendency to draw in lubricant material past the probe extension shaft bulkhead seal.

The connector mounted to the rear face of the LVDT transformer housing protrudes through the one end of the tubular housing and enables standard electrical contacts to be utilized in making an electrical connection to the LVDT.

A fixed angular orientation of the probe shaft is provided in an alternate version which includes an elongated bulkhead bushing element being formed with a slotted bore, which slot receives a roller bearing element mounted to a flat on the large diameter section of the stepped probe extension shaft and serves to maintain the angular orientation of the stepped probe shaft during its stroking movement.

In another embodiment, the actuation is achieved by a spring disposed in the forward end of the housing and urging the probe extension shaft to be advanced out of the actuator housing. An external return device is relied on in this embodiment.

A short range LVDT is incorporated in another version which LVDT occupies only a portion of the length of the transducer section of the housing. The probe extension shaft is adapted to pass through the LVDT core, and adjustment of the position of the LVDT in the housing enables the establishing of either pretravel or overtravel of the probe to locate the calibrated gaging range wherever required, while enabling the use of a relatively low cost short range LVDT.

DESCRIPTION OF THE DRAWINGS

FIG. 1 is a side view of the integrated transducer actuator assembly according to the present invention which also depicts the fluid pressure and electrical connections in a typical gaging setup.

FIG. 2 is a view in partial longitudinal section of the probe assembly depicted in FIG. 1.

DETAILED DESCRIPTION

Figure 3:
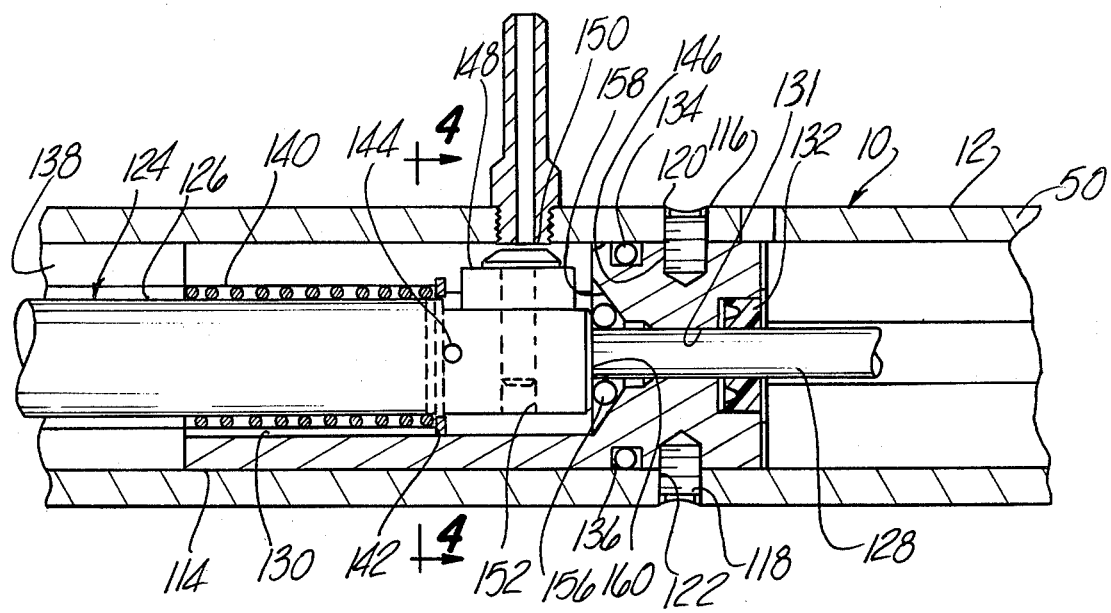
FIG. 3 is a longitudinal sectional view of a portion of an alternate form of the invention of the probe assembly depicted in FIGS. 1 and 2.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1 and 2, the probe assembly 10 is depicted in which is integrated an actuator arrangement together with the displacement transducer, both entirely contained within a steel tubular housing 12, in respective forward and rear sections of the interior thereof, such as to present an uninterrupted outer contour, except for the air pressure fitting 14, the protruding end of a probe shaft assembly 16 and the electrical connector portion 18 protruding at the other end of the tubular housing 12. This latter item is adapted to be electrically connected into the gaging system electronics.

Air pressure fitting 14 provides a means of connection for an air hose 20, connected to the source of air pressure 22 with pressurization controlled by a valve 24 operated by the gaging system controls.

As can be seen in FIG. 2, the interior of tubular housing 12 is occupied at one end by a displacement transducer 26 and the other end by an actuator arrangement indicated at 28.

The interior of the tubular housing 12 is partitioned by means of a bulkhead bushing 30 slidably received within the interior of the tubular housing 12 and secured at an intermediate point therein. The bulkhead bushing 30 is made of a suitable bearing material. The securement of the bulkhead bushing 30 is achieved by a pair of socket set screws 32 and 34 received in threaded openings 36 and 38, respectively, located at opposite points of the tubular housing 12 and passing into mating pockets 40 and 42 machined into the bulkhead bushing 30.

Within one end of the interior of the tubular housing 12 (to the right of the bulkhead bushing 30 as viewed in FIG. 2) is mounted an LVDT displacement transducer 44 which is of a size such as to be slidably received within the interior of the tubular housing 12 and secured therein by a retainer 46 seated on the rear face of the transformer housing 50 and urged to the left against lock washer 52 by means of a series of panhead screws 54 threadably received in the end face of the tubular housing 12.

The LVDT displacement transducer 44 is of a commercially available type, as for example, a Schaevidtz Engineering LVDT, Model No. 500-8CD. Such commercially available LDVT's include the aforementioned transformer housing 50 in which the respective coils are mounted, the transformer housing 50 also formed with an internal bore 56 into which is slidably received a ferromagnetic core 58. A Teflon liner may be provided lining the interior of the internal bore 56 to reduce the friction and wear between the ferromagnetic core 58 and the internal bore 56. Ferromagnetic core 58 affects the respective magnetic fields of the power and pickoff coils to produce an output signal which linearly corresponds with the position of the ferromagnetic core 58 within the internal bore 56 to thus provide an electrical signal corresponding to the position of the ferromagnetic core 58 in a manner very well known in the art.

Since such transducers are well known to those skilled in the art as are the operating principles thereof, a detailed description will not be here included.

In order to provide venting of the internal bore 56 to accommodate air movement into and out of the cavity as the ferromagnetic core 58 is moved, a vent opening 60 extends through the sidewall of the tubular housing 12 and into communication with a clearance space 62 intermediate the end face 64 of the bulkhead bushing 30 and the opposing end face 66.

As has been discovered by the present inventor, if a vacuum is allowed to develop in the internal bore 56, lubricating materials may be drawn into the displacement transducer 26 from the actuator arrangement 28 and the development of such a vacuum is prevented by the provision of the vent opening 60.

The probe shaft assembly 16 includes the ferromagnetic core 58 and in addition includes the stepped probe extension shaft 68 including a small diameter section 70 extending inwardly through a bore 72 formed within the bulkhead bushing 30, into the internal bore 56 with its end mounted to the ferromagnetic core 58, as by having a threaded end 76 received in a threaded bore 78 formed in the ferromagnetic core element 58. The threaded engagement between the small diameter section 70 and the core element 58 enables axial adjustment therebetween, in turn allowing the contact point to be adjusted without requiring movement of the entire device.

The small diameter section 70 passes through a cup seal 74 in passing through the bulkhead bushing 30.

The stepped probe extension shaft 68 is formed of a nonmagnetic material such as stainless steel so as to not affect the readings when positioned within the internal bore 56. Alternate nonmagnetic materials could include brass or aluminum, but stainless steel offers the advantage of a high strength of the protruding portion thereof such as to enhance the ruggedness sought to be achieved by the present design.

Thus, the stepped probe extension shaft 68 moves together with the ferromagnetic core 58.

A seal is provided at 80 which seals the space between the bulkhead bushing 30 and the interior of the tubular housing 12 such as to seal the region of the tubular housing 12 interior to the left of the bulkhead bushing 30 (as viewed in FIG. 2), i.e., within which is provided the actuator arrangement 28.

The opposite forward end of the tubular housing 12 is provided with an end cap bushing 82, also of suitable bearing material configured to be slidably fit within the interior of the tubular housing 12 and mounted in position at the opposite end thereof from the displacement transducer 26 by set screws 84 and 86 received in threaded holes 87 and 88, respectively, machined into the wall of the tubular housing 12 and passing into recesses 90 and 92.

An O-ring seal 94 is provided rendering the joint between the end cap bushing 82 and the interior of the tubular housing 12 fluid tight, while a cup seal 96 is in sealing engagement with the large diameter section 98 of stepped probe extension shaft 68. Thus, the region between the end cap bushing 82 and the bulkhead bushing 30 defines a sealed fluid pressure chamber, indicated at 100, which may be pressurized by introduction of fluid pressure via the air pressure fitting 14.

The difference in diameter of the respective large and small diameter sections of the stepped probe extension shaft 68 is sealingly engaged by the respective seals 74 and 96, creating a net fluid pressure acting on the probe shaft assembly 16 in the leftward direction as viewed in FIG. 2 tending to force the probe shaft assembly 16 outwardly into contact with the workpiece.

It can be appreciated that the differential area between the small diameter section 70 and the large diameter section 98 is much less than the area of a piston which would be slidably mounted within the tubular housing 12 such that a relatively modest force is generated by the fluid pressure exerted in chamber 100. This enables relatively high pressure air to be introduced through the air pressure fitting 14 while not producing excessively high forces on the probe shaft assembly 16.

In order to provide return movement of the probe shaft assembly 16, a return coil spring 102 is provided having one end seated on a washer 104 in engagement with the O-ring seal 94. The other end is seated on a washer 106 mounted on a large diameter section 98 abutting a retainer ring 108, such as to exert a rightwardly directed force on the probe shaft assembly 16 upon compression thereof.

Thus, the probe shaft assembly 16 is moved into the rightmost position shown in FIG. 2 whenever the chamber 100 is unpressurized.

A shoulder 112 between the extension shaft sections 70 and 98 provides an abutment with an end face 114 of the bulkhead bushing 30 with a cushioning O-ring 100 interposed to locate the probe shaft assembly in the return position.

A threaded portion 99 of the large diameter section 98 enables mounting of the probe contact components thereto (not shown) which may be adjustable ease zeroing of the device at the contact point.

It can thus be seen by this design that the objects of the invention have been achieved in that there is a very rugged construction with all of the relatively delicate components mounted within the steel tubular housing 12 with the relatively large diameter solidly supported stainless steel section 98 protruding therefrom which is much more rugged in comparison with previous designs.

The fluid pressure actuator arrangement is located entirely within the tubular housing 12 as is the displacement transducer 26, and the fluid pressure actuator arrangement 28 is located forwardly of the LVDT displacement transducer 44 such as to leave the electrical connector portion 18 undisturbed.

In addition, this enables the confinement of the entire housing within the tubular housing 12. At the same time, the provision of the stepped probe extension shaft 68 creates a differential pressure acting on the probe shaft assembly 16 enabling the fluid pressure forces to be kept relatively modest and eliminating the need for a separate piston structure, thus simplifying the arrangement and also enabling the use of relatively high pressure air and eliminating the need for costly low pressure regulator devices.

The arrangement likewise does not involve the incorporation of the LVDT component as a part of the fluid pressure actuation, and requires substantially no modification other than the mounting of the ferromagnetic core 58 to the stepped probe extension shaft 68.

The mounting of the probe extension shaft 68 in the spaced bushings eliminates side loading of the core 58.

Also, the threaded securement therebetween enables the adjustment of the contact point without readjustment of the position of the entire device.

In some gaging application, as when probing contacts are offset from the axis of the probe, it is necessary for the probe shaft assembly 16 to maintain a fixed angular orientation, i.e., to be prevented from rotating within the tubular housing 12.

Figure 4:
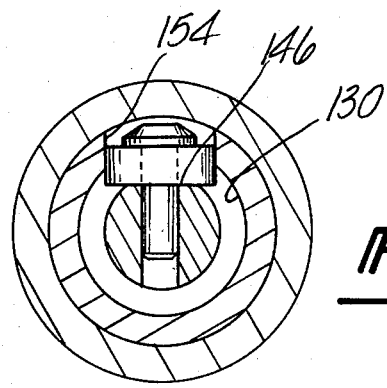
FIG. 4 is a view of the section 4—4 taken in FIG. 3.

An alternate embodiment of the invention is depicted in FIGS. 3 and 4, having a fixed angular orientation of the probe shaft assembly. In this version, an elongated bulkhead bushing 115 is provided slidably received within the interior of tubular housing 12, and retained by set screws 116 and 118 received in threaded bores 120 and pockets 122 machined into the outside of the bulkhead bushing 115.

The stepped probe extension shaft 124 has its large diameter section 126 received within a bore 130 formed in the lefthand section of the bulkhead bushing 115. The small diameter section 128 is slidably received in bore 131 within the bulkhead bushing 115 with the seal provided at 132. An O-ring seal 134 is incorporated received within a recess 136 in order to seal the exterior of the bulkhead bushing 115 within the tubular housing 12 in order to define a fluid pressure chamber 138 to the left of the bulkhead bushing 115.

The probe assembly return spring 140 encircles the large diameter section 126 and is received within bore 130 of the bulkhead bushing 115, seated at its forward end against washer 142 in turn axially secured by a roll pin 144 passing through the stepped probe extension shaft 124.

The portion of the large diameter section 126 forward of the washer 142 is formed with a milled flat 146 against which is mounted a bearing roller 148, mounted for rotation about a buttonhead screw 150 threadably received within a threaded bore 152 extending into the milled flat 146 and transversely to the axis of stepped probe extension shaft 124. The bearing roller 148 is received within a slot 153 extending longitudinally along the length of the bore 130 and sized to just receive the bearing roller 148 and allow free rolling movement therethrough.

This arrangement thus precludes relative rotation between the stepped probe extension shaft 124 and the rear of the assembly by the interaction of the bearing roller 148, acting as an anti-rotation element, and the slot 154 while not introducing a large degree of friction between the stepped probe extension shaft shaft 124 and the bulkhead bushing 114.

An O-ring cushion 156 is provided received within a conical recess 158 formed in the bottom of the bore 130 and which is adapted to contact the shoulder 160 formed by the juncture of the small diameter section 128 and large diameter section 126 of the stepped probe extension shaft 124 serving to cushion the returning movement in similar fashion to the above-described embodiment.

Many variations of the specifics of this design are of course possible, while enabling realization of the benefits of this general arrangement.

Figure 5:
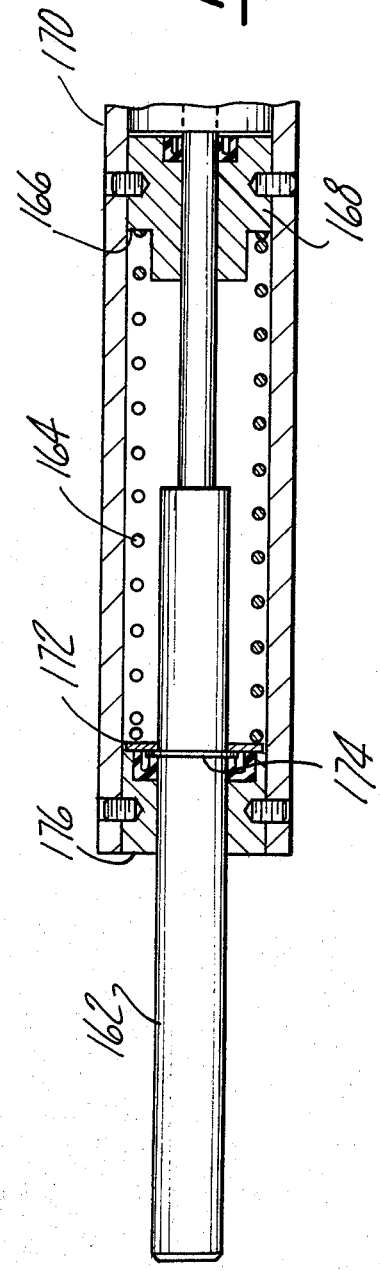
FIG. 5 is a fragmentary view of the forward actuator section of another embodiment of the present invention, shown in partial longitudinal section.

For example, rather than the fluid pressure actuation arrangement depicted in FIGS. 1 and 2, some applications require a spring extension of the probe, with an external retraction of the probe shaft. A suitable arrangement for producing such extension is depicted in FIG. 5 in which the probe extension shaft 162 is urged outwardly by means of a compression spring 164, disposed encircling the probe extension shaft 162 and being seated against the radial face 166 of the bulkhead bushing 168 secured within the housing 170, in similar fashion to the above-described embodiment.

Compression spring 164 is seated at its opposite end on a thrust washer 172, which in turn is fixed axially by means of a snap ring 174 received in the outside diameter of probe extension shaft 162. The forward end of the probe extension shaft 162 is slidably seated in the end cap bushing 176 in similar fashion to the above-described embodiment.

Thus, the probe extension shaft 162 is normally urged outward by the compression spring 164 such that actuation is by means of the compression spring 164.

The external gaging setup would in this case include means for causing retraction of the probe extension shaft 162 against the outward biasing force exerted by the compression spring 164.

It is usual in a typical gaging setup that the motion of the probe to reach the gaged item is much greater than the actual range of gaging motion required since most of the travel, or a large portion thereof, is required to reach the point whereat the gaging is to take place.

Accordingly, there is not required a generation of calibrated gaging signals throughout the range of motion of the probe assembly. Typically, LVDT transducers which have extensive ranges, i.e., on the order of 1 inch stroke as in the probe assemblies described above, are considerably more costly than the relatively short range LVDT transducers, i.e., $\frac{1}{2}$ inch gaging range.

Figure 6:
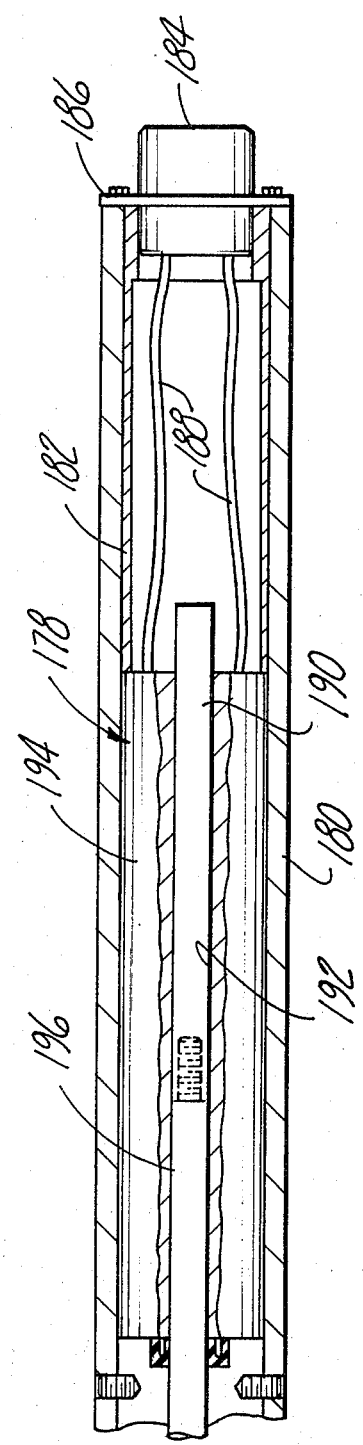
FIG. 6 is a fragmentary view of the rear transducer section of another alternate form of the probe assembly shown in partial longitudinal section.

The probe assembly according to the present invention, provided with a tubular housing within which is disposed in the forward and rear sections the actuation arrangement and the transducer arrangement, thus lends itself to an arrangement of components in which a desired pretravel or overtravel of the probe extension shaft can be achieved and a relatively short range LVDT transducer employed which gages the probe motion only in the relatively short range of motion in which precisely calibrated gaging signals are required to be generated. Such an arrangement is depicted in FIG. 6 in which a relatively short length LVDT core 178 is utilized positioned in housing 180 and occupying only a portion of the length of the rear transducer section of the housing 180. The remainder of the axial space is occupied by a tubular spacer 182 which extends out to the rear face of the housing 180 and which is held beneath an electrical connector section 184 having a flange 186 serving to retain the tubular spacer 182.

In this case, electrical extension leads 188 are provided extending from the core 178 to the electrical connector fitting 184.

It can be seen that the ferromagnetic core element 190 of the LVDT core 178 protrudes through the bore 192 of the LVDT housing 194. In this case, the bore 192 must extend entirely through the LVDT housing 194 in order to allow this "swallowing" of the core element.

Thus, the core element 190 does not move into the primary gaging range until after a predetermined pretravel of the probe extension shaft assembly 196.

Alternatively, the LVDT housing 194 could be positioned to the rear such that the probe extension shaft assembly 196 will move through the primary gaging range and overtravel past the point whereat the gaging signal is required for those particular applications which require such overtravel.

Accordingly, a relatively low cost, short range LVDT transducer would be employed by merely shifting or adjusting its position within the housing 180.

The embodiments of the invention in which an exclusive property or privilege is claimed are defined as follows:

1. A self-actuated displacement transducer probe assembly comprising:
   a housing comprising a length of tubing having an internal bore of uniform internal diameter extending the full length of the tubing;
   a displacement transducer mounted within said internal bore at one end of said tubular housing, said displacement transducer including a movable element means for generating an electrical signal corresponding to the position of said movable element;
   an actuator arrangement mounted within said internal bore at the other end of said tubular housing, said actuator arrangement including a probe extension shaft slidably mounted in said tubular housing having one end extending out of said other end of said tubular housing;
   means securing said probe extension shaft to said movable element;
   said actuator arrangement further including means generating a force acting on said probe extension shaft urging said probe extension shaft in a direction out of said tubular housing;

return spring means urging said probe extension shaft to a return position within said tubular housing;

whereby actuation of said actuator arrangement causes said probe to be extended from said tubular housing in order to cause movement of said movable element therewith thereby generating electrical signals corresponding to the position of said probe extension shaft.

2. The self-actuated displacement probe assembly according to claim 1 wherein said actuator arrangement includes fluid pressure means generating a fluid pressure force acting on said probe extension shaft urging said probe extension shaft in a direction out of said tubular housing, and return spring means urging said probe extension shaft to a return position within said tubular housing, whereby actuation of said fluid pressure actuator arrangement causes said probe to be extended from said tubular housing in order to cause movement of said movable element therewith.

3. The self-actuated displacement probe assembly according to claim 1 wherein said probe extension shaft includes a small diameter section thereof secured to said movable element and further includes a bulkhead bushing mounted within said tubular housing at an intermediate location between the one and other ends of said tubular housing with said displacement transducer located on one side and said actuator arrangement located on the other side thereof and wherein said small diameter section of said probe extension shaft is slidably mounted within said bulkhead bushing and extends thereto into contact with said movable element.

4. The self-actuated displacement probe assembly according to claim 3 wherein said displacement transducer comprises an LVDT transducer including a transformer housing having a bore formed therein and wherein said movable element comprises a ferromagnetic core element slidably disposed within said transformer housing bore and wherein said probe shaft extension small diameter section extends into said transformer housing and bore and secured to said ferromagnetic core element.

5. The self-actuated displacement probe assembly according to claim 4 wherein said probe shaft small diameter section is secured to said core element by a threaded connection allowing axial adjustment therebetween.

6. The self-actuated displacement probe assembly according to claim 4 wherein said LVDT transducer includes an electrical connector assembly mounted to a rear face of said transformer housing and wherein said transformer housing is mounted at one end of said tubular housing with said connector assembly protruding therefrom, whereby mating of a corresponding electrical connector is enabled.

7. The self-actuated displacement probe assembly according to claim 6 wherein said probe extension shaft is formed of a nonferromagnetic material.

8. The self-actuated displacement probe assembly according to claim 7 further including a vent opening extending through a sidewall of said tubular housing and in communication with a space located between said bulkhead bushing and said LVDT transformer housing, whereby said movement of air into and out of said transformer housing bore is vented through said vent opening.

9. The self-actuated displacement probe assembly according to claim 3 wherein said probe extension shaft further includes a large diameter section joined to said probe extension shaft small diameter section disposed on said other side of said bulkhead bushing and also including an end cap bushing having a bore formed therein slidably receiving said large diameter section; and further including means sealing said probe extension shaft small diameter section during sliding movement through said bulkhead bushing bore and further including means sealing said large diameter section during sliding movement in said end cap bushing bore; means sealing said respective bulkhead bushing and end cap bushing within said tubular housing, whereby said space therebetween defines a fluid pressure chamber; and wherein said actuator arrangement also includes means for introducing fluid pressure into said fluid pressure chamber, whereby said differential area of said large diameter section and said small diameter section induces a net fluid presure force acting on said probe extension shaft tending to move said probe extension shaft in a direction to extend said large diameter section out through said end cap bushing bore.

10. The self-actuated displacement probe assembly according to claim 9 further including return spring means comprising a coil spring encircling said large diameter section and means axially fixed to one end thereof with respect to said tubular housing and to the probe extension shaft at its other end enabling a return spring force thereof to be applied to said probe extension shaft to act in a direction tending to retract said probe extension shaft into said tubular housing.

11. The self-actuated displacement probe assembly according to claim 10 further including an O-ring disposed about said probe extension shaft at the point whereat a shoulder is located, created by the difference in diameter of said large diameter section and said probe extension shaft small diameter section and wherein said bulkhead bushing formed with a radial face tending to come into abutment with said shoulder, whereby said shoulder and said radial face and said O-ring constitute a cushioned return stop means locating said probe extension shaft in a return position under the urging of said return spring means.

12. The self-actuated displacement probe assembly according to claim 3 wherein said probe shaft extension includes a large diameter section adjacent said small diameter section, and wherein said small diameter section is slidably received within a bore formed in said bulkhead bushing and wherein said bulkhead bushing is further formed with a larger bore receiving one end of said large diameter section adjacent said small diameter section and wherein said bore is formed with a longitudinally extending slot; said large diameter probe extension shaft provided with an anti-rotation element mounted thereto and extending into said slot; said bulkhead bushing fixed within said tubular housing, whereby said probe extension shaft is prevented from rotating relative said tubular housing by engagement of said element with said slot formed in said bulkhead bushing bore.

13. The self-actuated displacement probe assembly according to claim 12 wherein said anti-rotation element comprises a rotatable bearing roller and wherein said large diameter section is formed with a longitudinally extending flat and wherein said roller is mounted with said flat bearing roller mounted atop said flat and positioned within said slot.

14. The self-actuated displacement probe assembly according to claim 13 wherein said spring bias means comprises a compression spring extending into said clearance opening formed in said bulkhead bushing and including a transversely mounted stop pin extending through said large diameter section of said probe extension shaft in the region of said flat.

15. The self-actuated displacement probe assembly according to claim 4 wherein said transformer housing is of substantially shorter length than said one end of said tubular housing and the stroke of said probe shaft extension, and further including a spacer mounted within said one end axially locating said transformer housing therein.

16. The self-actuated displacement probe assembly according to claim 15 wherein said transformer housing bore extends through the length of said transformer housing, and wherein said core element extends through and past said transformer housing with said probe shaft extension in the retracted position, whereby a pretravel of said core element is provided.

17. The self-actuated displacement probe assembly according to claim 1 wherein said actuator arrangement comprises an extension spring and means mounting said extension spring means to generate a force acting on said probe extension shaft in a direction out of said tubular housing.

* * * * *